(No Model.)

A. DICKINSON.
WHEELED CARRIAGE.

No. 352,306. Patented Nov. 9, 1886.

Witnesses
W. R. Haight
D. P. Cowl

Inventor
Alfred Dickinson
by Wm H Babcock
Attorney

United States Patent Office.

ALFRED DICKINSON, OF DARLASTON, COUNTY OF STAFFORD, ENGLAND.

WHEELED CARRIAGE.

SPECIFICATION forming part of Letters Patent No. 352,306, dated November 9, 1886.

Application filed August 3, 1886. Serial No. 209,929. (No model.) Patented in England May 20, 1885, No. 6,164.

*To all whom it may concern:*

Be it known that I, ALFRED DICKINSON, of Darlaston, in the county of Stafford, England, locomotive superintendent, and a subject of the Queen of Great Britain, have invented certain new and useful Improvements in Wheeled Carriages for Use Alternatively upon Railways or Roadways, (for which I have obtained Letters Patent in Great Britain, No. 6,164, May 20, 1885;) and I do hereby declare that the following is a sufficient description of the invention to enable those skilled in the art to which it appertains to carry the same into practical effect.

My invention has for its object improvements in wheeled carriages for use alternately upon railways and roadways—*i. e.*, carriages which combine in one facility for running upon both ordinary roads and also upon rails, and which may at a very short notice and without the help of skilled labor or special preparations be so fitted as to be almost equally adapted for either of the above-named conditions as if specially built for either. It is of course quite impossible to fulfill both conditions in one carriage as completely as would be the case in two separate carriages; but my invention does meet both the conditions of ordinary road and rails in a very thorough manner, so that a vehicle running upon the rails may in, say, two or three minutes be transformed into a vehicle for a common road, and this is done by the attendant himself without any special help, which is a most important matter.

A carriage built according to my invention has two sets of wheels, one set being plain wheels for use upon common roads and the other set being flanged wheels for use upon railways, which also includes tramways. The flanged wheels and the axles thereof form adjuncts to the axles of the common road-wheels, and by an arrangement of lever and screw the flanged wheels may at will be lowered and the common road-wheels raised, making the vehicle suited for railway or tramway work, or in the alternative the flanged wheels may be raised and the road-wheels lowered for common road-work.

In order that my invention may be clearly understood and more easily carried into practice, I have appended hereunto a sheet of drawings showing a carriage which I have built according to my invention, and by the help of which I shall better ascertain the nature thereof and in what manner it may be performed, and from which practical men will be able to adapt the invention to other vehicles and other varying conditions which may in practice be met with.

Figure 1:
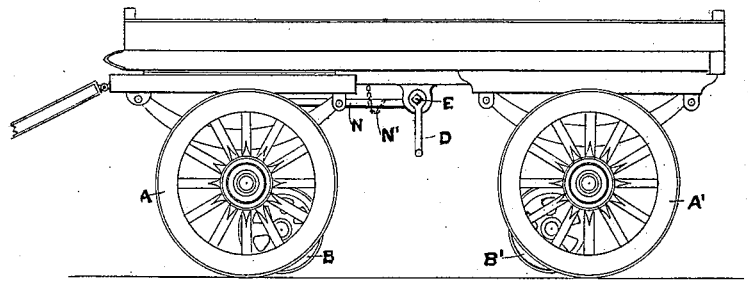
Figure 2:
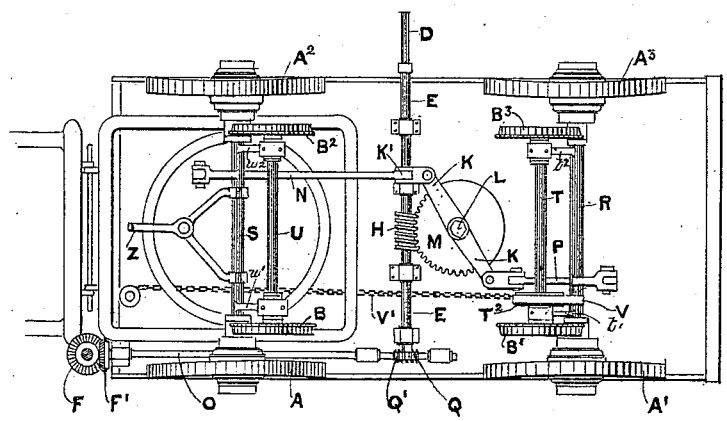
Figure 3:
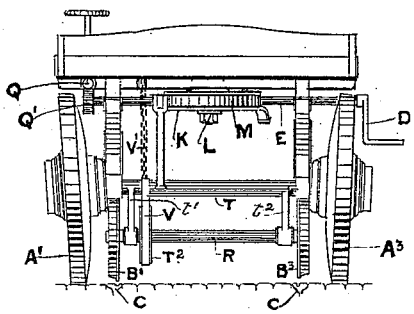

Figure 1 is a side elevation of a carriage, showing the common road-wheels A and A' supporting the carriage upon a paved road and the supplemental or rail wheels B and B' raised off the rails. Fig. 2 is a partly-inverted plan of the same carriage, showing the wheels A, A', $A^2$, and $A^3$ down on the common paved road and the rail-wheels B, B', $B^2$, and $B^3$ lifted up. Fig. 3 is an end elevation showing the axles and parts of gear more clearly.

The drawings illustrate a carriage in a partly-converted condition—*i. e.*, the rail-wheels B, B', $B^2$, and $B^3$ have just been lifted off the rails C by means of the winding-handle D, which revolves the shaft E and turns the worm H, which works in the worm-wheel M, thus operating the lever K, which turns upon a center, L, upon the plate M, which is firmly attached to the under frame of the vehicle. To the lever K are attached the rods N and P, which operate the levers upon the shafts R and S, so as to turn them round sufficiently to lift the rail-wheel shafts T and U through the levers $u'$ and $u^2$ and $t'$ and $t^2$, these levers being either welded, keyed, or otherwise fastened to the shafts R and S, the other ends of the levers carrying suitable bearings in which the rail-shafts T and U revolve. These levers are brought into a vertical position when the rail-wheels B are used. Now, when the conversion of the vehicle from rail to road is complete, the lever N is lifted out of the hook K' and hangs loosely upon the chain N', which permits the front carriage or bogie to turn freely. There may also be used a locking-pin to secure the bogie when the vehicle is used for rails; but when used for common roads and the lever-rod N hangs loosely a locking-pin is used to secure the front wheels, B and B', and their shaft U in the suspended position.

I may manipulate the lever K by means of bevel-wheels F and F', the rod O, with the worm Q at the end, acting on the toothed wheel Q', which is fixed to the end of the shaft E, and by which means the driver, with the aid of a hand-wheel or other contrivance, would be enabled to operate the change of wheels while sitting on the front of the wagon, in which case the handle D would not be required, but might be retained; or I may fix a swivel-nut to one end of the lever K, in which a horizontal screw operated by the handle D would work, and thereby cause the plate M to revolve and act upon the rods N and P; but in this case the handle D would be near the end of the wagon.

It will of course be understood that the wheels A run loose upon the shafts R and S, and these shafts are only capable of turning sufficiently to bring the wheels B into and out of work. The shafts U and T are, however, fast to the wheels B, and run with them in the bearings before mentioned.

The vehicle may be coupled to the engine through the bar Z, and either the shafts shown or a bar or other suitable portable arrangement may be used for the horse or horses, and stowed away under the vehicle or elsewhere when not required.

The rail-wheels are braked by the wooden pulley T², rigidly fixed to the axle T and encircled by the spring-band V, operated by the chain V'.

What I claim is—

1. In a wheeled carriage, two sets of wheels raised and lowered therefrom, in combination with shaft E, means, substantially as set forth, for operating the same, worm H, carried by said shaft, wheel M, into which said worm gears, and the levers which operate said wheels, substantially as and for the purpose set forth.

2. The combination of the hand-wheel, the shafts O E, and the interposed gearing F F' Q Q', whereby motion is communicated, with the worm H, carried by shaft E, the wheel M and lever K, operated thereby, the track-wheels, capable of vertical motion, and the levers interposed between lever K and the axles of said wheels for raising or lowering them when the hand-wheel is turned, substantially as set forth.

3. A vehicle provided with two vertically-movable sets of wheels, one set for running on ordinary roads and the other set for running on rails, in combination with a series of levers connected to the axles, whereby all four wheels of one set are simultaneously raised while those of the other set are lowered, substantially as set forth.

In testimony that I claim the foregoing as my own I affix my name in the presence of two witnesses.

ALFRED DICKINSON.

Witnesses:
LLOYD BARKER,
ARTHUR MOUSLEY.